Feb. 1, 1944.  B. W. MOORE  2,340,679
APPARATUS FOR WELDING SEAMS OF METAL DRUMS
Filed Aug. 2, 1940  3 Sheets-Sheet 1
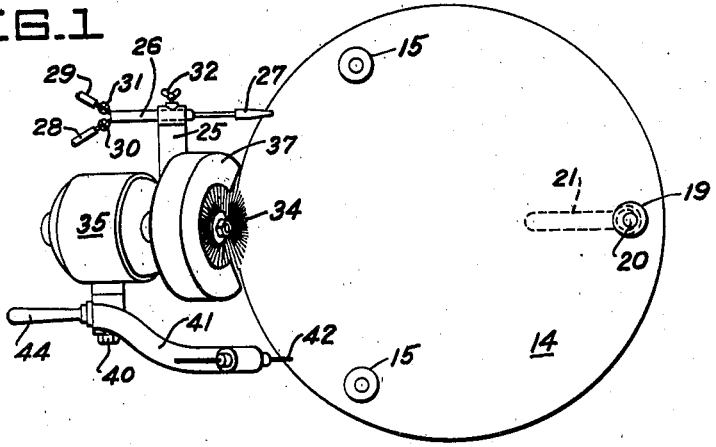
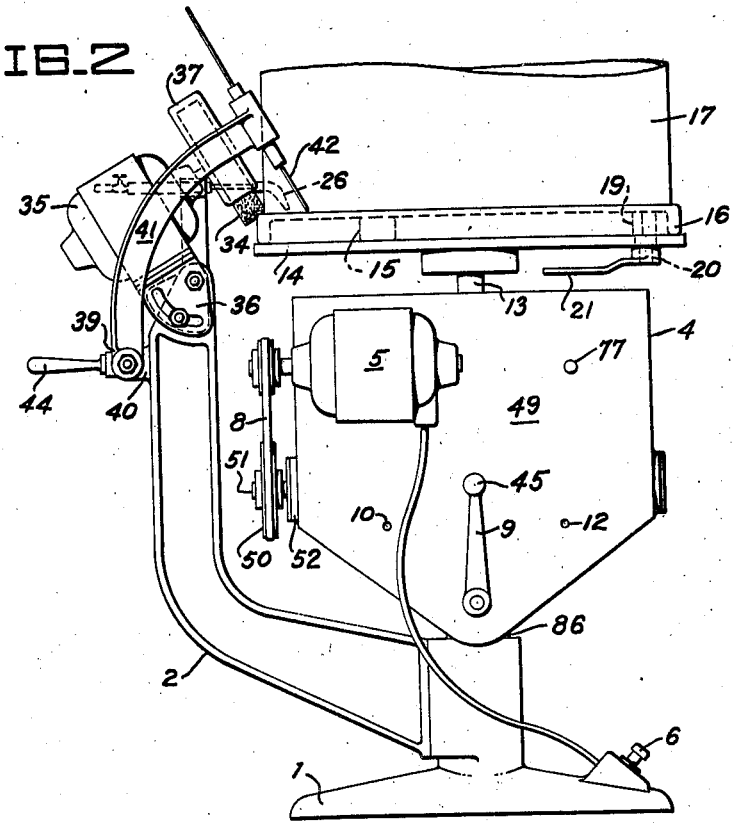
INVENTOR
BEN WILLIAM MOORE, DECEASED
MYRTLE CLARE MOORE ADMINISTRATRIX
BY Charles O. Bruce
ATTORNEY

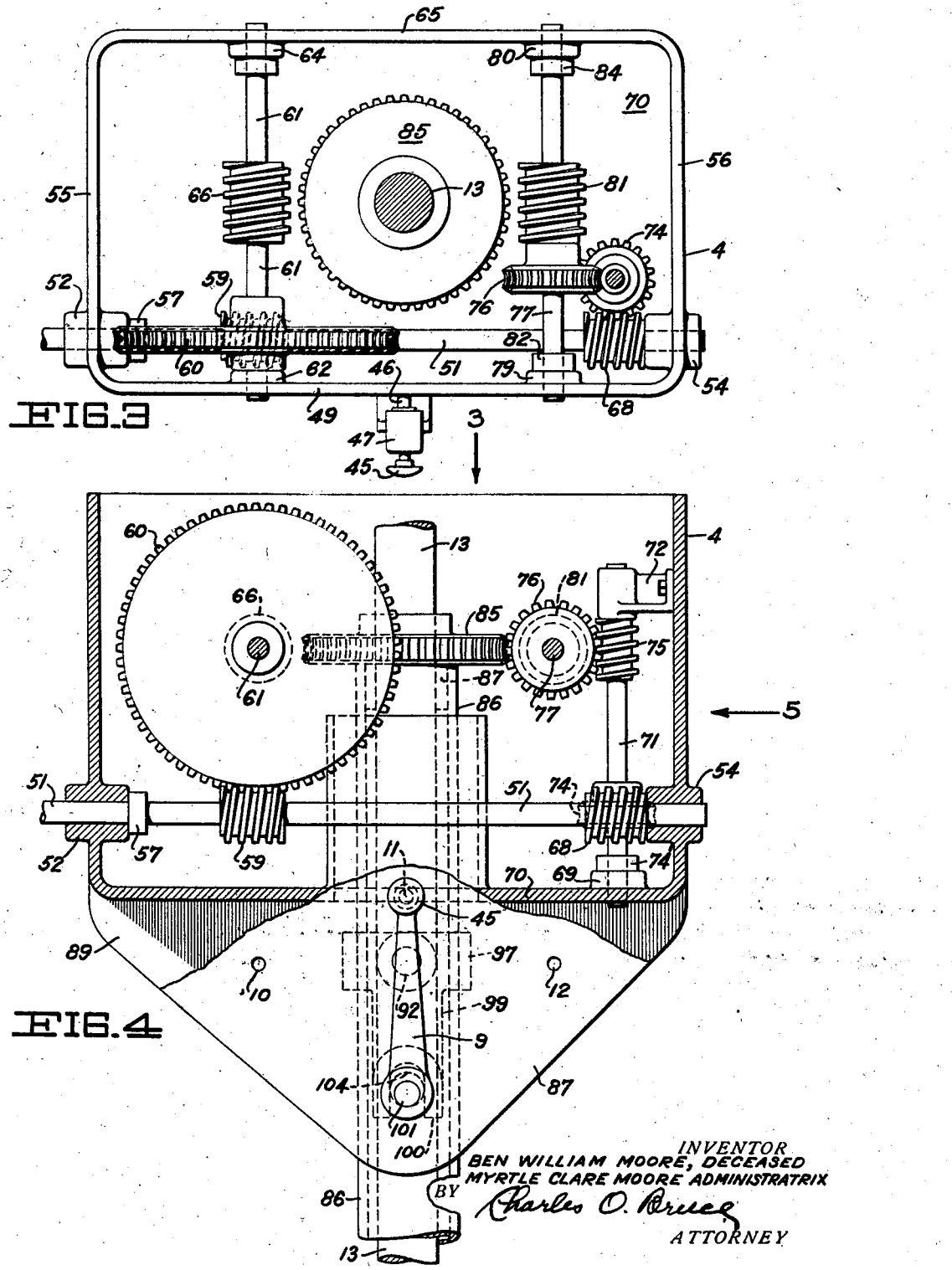

Feb. 1, 1944.  B. W. MOORE  2,340,679
APPARATUS FOR WELDING SEAMS OF METAL DRUMS
Filed Aug. 2, 1940   3 Sheets-Sheet 3
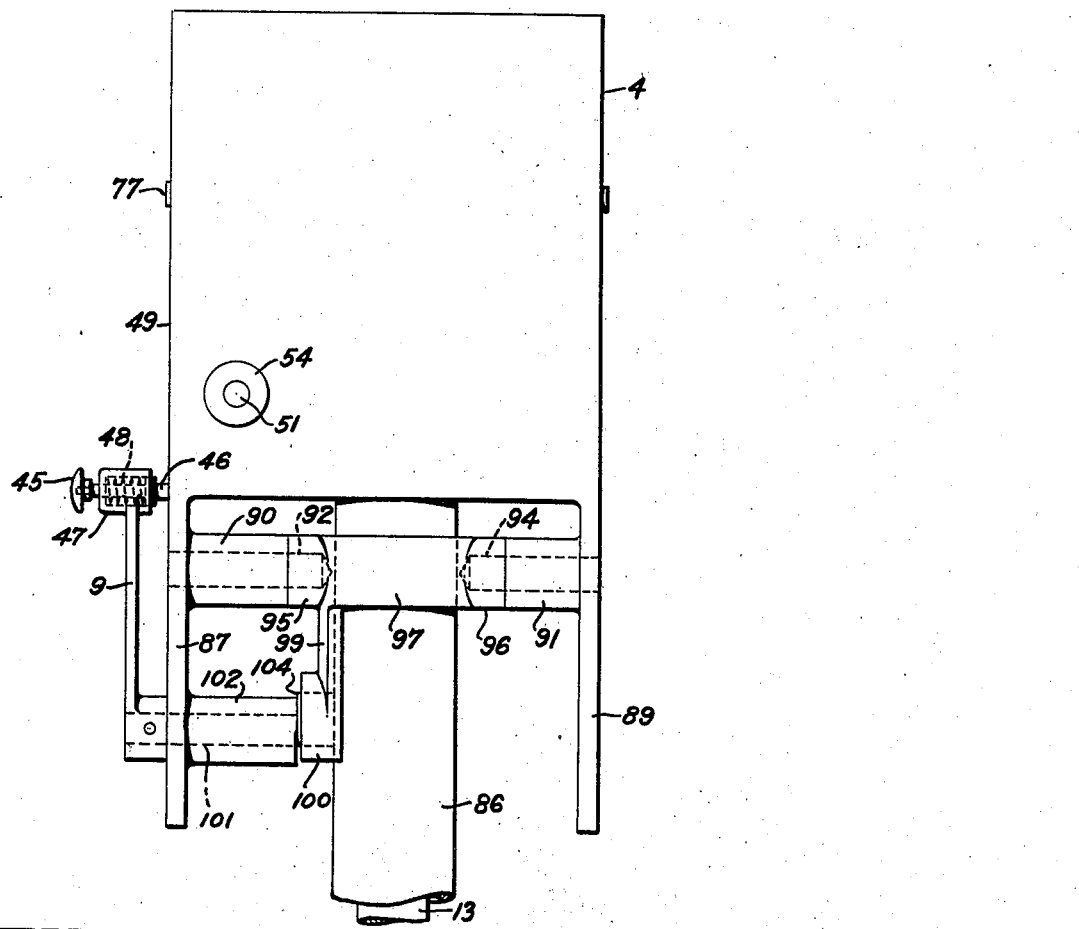
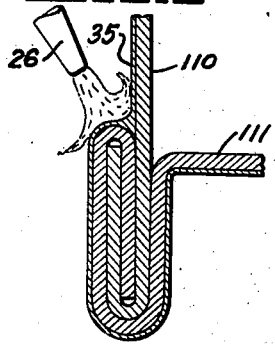
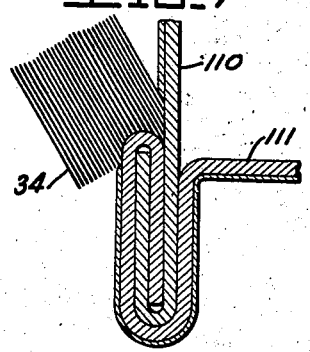
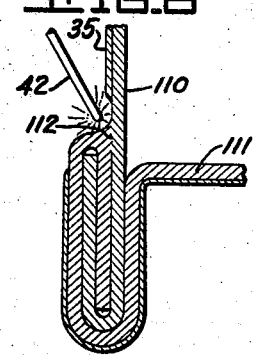
INVENTOR
BEN WILLIAM MOORE, DECEASED
MYRTLE CLARE MOORE ADMINISTRATRIX
BY
Charles O. Bruce
ATTORNEY Patented Feb. 1, 1944

2,340,679

UNITED STATES PATENT OFFICE 2,340,679

APPARATUS FOR WELDING SEAMS OF METAL DRUMS

Ben William Moore, deceased, late of Oakland, Calif., by Myrtle Clare Moore, administratrix, Oakland, Calif.

Application August 2, 1940, Serial No. 349,966

2 Claims. (Cl. 74—354)

The invention relates to welding, and more particularly to apparatus for welding the seams of metal drums.

The invention, while applicable to the welding and repair of metal drums in general, is particularly suitable for the repair and finishing of drums used commercially for the shipment of gasoline, oil, and similar fluids. Such drums are fabricated from sheet steel, with the ends joined to the cylindrical body by a crimped seam.

The drum construction at the seams which join the cylindrical body to the ends is shown in sectional detail in Figure 6. While such seams are initially tight, the loads carried and the strains encountered in transportation may loosen them in time. Particularly with very volatile hydrocarbons, the slightest failure at the seam renders the barrel or drum unfit for use, in view of the fire hazard as well as the loss of the liquid.

Previous attempts to repair such strained seams by welding them with gas and electric torches, have not proved to be commercially practical.

The present invention contemplates the provision in a single machine of means for removing galvanizing, paint, or other protective coatings, with means for mechanically removing the oxide coating from and cleaning the surface of the steel, and means for welding the seam tight immediately after the last cleaning step. It may be constructed so inexpensively, and maintained and operated so easily and rapidly, that it makes repair of such drums commercially successful.

The objects of the invention include:

(1) Providing improved apparatus for welding the seams on drums having a protective coating thereon;

(2) Providing improved means for automatically pretreating and repairing drum seams;

(3) Providing improved automatic means for insuring the proper sequence and timing of operations in a drum seam repairing device;

(4) Providing improved apparatus for accomplishing all necessary steps in the repair of drum seams;

(5) Providing improved apparatus for facilitating the handling of drums in the repairing of drum seams;

(6) Providing improved apparatus which makes rapid and economical drum repair possible.

The invention possesses numerous other objects and features of advantage, some of which, together with the foregoing, will be set forth in the following description of specific apparatus. It is to be understood that the principles of my invention are applicable to other apparatus, and that I do not limit myself in any way to the apparatus of the present application, as I may adopt various other embodiments within the scope of the appended claims.

In the drawings—

Figure 1 is a top view of the improved apparatus capable of operation in accordance with the improved method.

Figure 2 is a side view of the device, showing a drum to be welded in position on the turntable.

Figure 3 is a top view of the gear box and variable speed driving gears, looking in the direction indicated by arrow 3 in Figure 4.

Figure 4 is a side view, partially in section, of the gear box.

Figure 5 is an end view of the gear box, looking in the direction indicated by arrow 5 in Figure 4.

Figure 6 is a fragmentary, sectional view of the drum end seam, showing the first step in the repair of drum seams with my improved apparatus.

Figure 7 is a view similar to that of Figure 6, showing the second step in the repair of drum seams with my improved apparatus.

Figure 8 is a view similar to that of Figures 6 and 7, showing the final step in the repair of drum seams with my improved apparatus.

The apparatus of the invention, in general, comprises a supporting base which carries a gear box and a tool arm. From the gear box, a shaft extends upwardly, carrying a turntable on which the drum to be repaired is supported. The tool arm carries a torch to burn off paint, lacquer, galvanizing and other protective coatings. As the turntable rotates, the portion of the seam heated by the torch is cleaned mechanically by a motor-driven wire brush. The cleaned portion then passes under a welding torch, which completes the repair. After a complete revolution of the turntable, the drum may be reversed and the other end similarly repaired. It is then ready for cooling, and the application of a coat of protective lacquer or similar material, if desired, before being returned to service.

Referring now to the drawings for a more detailed explanation of the apparatus and the method embodied in its operation, it comprises a base 1, supporting a tool arm 2 and a gear box 4. On the box 4 is mounted a motor 5, controlled by a foot switch 6 fixed on the base 1. A belt drive 8 transmits power from the motor 5 to a set of gears within box 4. The details of the gear train, which allows the ratio to be changed by moving a shift lever 9 to engage stops 10, 11 and 12 on gear box 4, will be explained hereafter in connection with Figures 3-5. A shaft 13 projects upwardly from gear box 4, supporting at its upper end a turntable 14. On this turntable 14 are fixed two studs or dogs 15, so positioned as to engage the inside of the rim 16 of a drum 17 when symmetrically placed on the turntable for repair, and these studs 15 co-operate with a third stud 19, adjustable as to position to allow for irregularities in the rim and to permit pressure engagement of the studs against the rim for effecting a positive holding of the drum to the turntable. The adjustment of the third stud 19 may be secured, for example, by an eccentric mounting of the stud with respect to a supporting bolt 20 extending through the table 14 and threadedly connected to a handle 21. When the drum 17 is placed on the turntable 14, with the inner surface of rim 16 engaging fixed studs 15, the adjustable stud 19 is turned so that the drum is securely held by pressure created between the rim and the three studs 15 and 19. The drum 17 is thus pressure held on the table concentrically with the shaft 13 at the three symmetrically spaced points of contact.

The tool carrying arm 2 pivotally mounts a bracket 25 for adjustably carrying a torch 26 having a nozzle 27 arranged to give a narrow flame. Gas and oxygen are supplied from any conventional source, not shown, through feed lines 28 and 29, respectively, the mixture being controlled by valves 30 and 31 in the feed lines. The position of nozzle 27 is controlled by the pivotal position of its carrying bracket 25 and its adjusted position in said bracket, so that the flame may be directed against the upper portion of the seam, as such seam is viewed in Figure 6. Control valves 30 and 31 are adjusted to give an oxidizing flame, which will burn off any protective coating such as galvanizing, paint, or similar material adjacent the upper part of the seam. It is not essential that all of the coating be entirely burned away by the torch, but it should be loosened enough so that it will be entirely removed, together with any surface oxide formed by the action of the torch 26, by the application of a wire brush 34 to the seam. The brush 34 is driven by a high speed motor 35 held on arm 2 by an adjustable bracket 36. It has been found that a wire brush gives very satisfactory results, removing adhering paint, oxide, scale, and other foreign matter, as well as burnishing the surface clean so that a satisfactory bond may be made by the welding torch. A guard 37 is mounted about the brush to protect the operator from flying particles thrown off during the brushing operation.

A bell crank 39 is pivotally connected to a boss 40 on tool arm 2. One arm 41 of the crank 39 is curved and arranged to hold a welding rod 42. The other forms a handle 44, by means of which the operator can control the position and feed of the welding rod.

The speed of rotation of the turntable 14 and drum carried thereon is controlled by the position of shift lever 9. A knob 45 is fixed to a pin 46 extending slidably through an enlarged end 47 of lever 9. Within enlarged end 47, a spring 48 urges the pin toward face plate 49 of the gear box 4.

In certain positions, the lever 9 is held by stops such as 10, 11, and 12, which may be holes in the face plate 49 into which pin 45 may slide under pressure from the spring 48.

Within gear box 4 is arranged the mechanism for transmitting power from the motor 5 to the turntable 14. A pulley wheel 50, driven by belt 8, is fixed to a shaft 51 rotatably supported by journals 52 and 54 formed in the end walls 55 and 56, respectively, of gear box 4, which is elongated in a direction parallel to front wall 49. A collar 57 is fixed on shaft 51 adjacent journal 52, and prevents axial movement of the shaft in one direction. Near collar 57, a worm 59 is fixed to shaft 51, which worm engages a worm wheel 60 fixed to a cross shaft 61. The cross shaft 61 is rotatably supported in suitable journals 62 and 64, formed in the front wall 49 and rear wall 65, respectively, of gear box 4. Shaft 61 has a worm 66 fixed centrally thereof. The ratio between worm 59 and worm wheel 60 is such that a considerable reduction of speed occurs between shafts 51 and 61.

A worm 68 is mounted on shaft 51 adjacent journal 54, and serves to prevent axial movement of the shaft in a direction opposite to that controlled by collar 57. A journal 69, formed in bottom 70 of box 4, rotatably supports the lower end of a vertical stub shaft 71, the upper end being journaled in a bracket 72 fixed to the end wall 56 of the gear box. A worm wheel 74 is fixed on shaft 71 in position to engage the worm 68. The alinement between the worm 68 and worm wheel 74 is maintained by a thrust collar 74' fixed on shaft 71 against bearing 69, and a worm 75 fixed on shaft 71 adjacent the shaft supporting bracket 72. This worm 75 meshes with a worm wheel 76 which is mounted on a cross shaft 77 rotatably supported parallel to and in horizontal alinement with the cross shaft 61, by journals 79 and 80 formed in front and rear walls 40 and 65, respectively. A worm 81 is mounted centrally of the shaft 77, and the axial position of the latter is maintained by collars 82 and 84 adjacent journals 79 and 80, respectively. The gear ratio between shafts 51 and 77 is such that shaft 77 revolves more rapidly than does shaft 61.

On the shaft 13, which supports the turntable 14, there is mounted a worm wheel 85. A cylindrical sleeve 86 encircles shaft 13 below worm wheel 85 and is maintained in spaced relationship to the shaft by a bushing 87 which at the same time permits free rotation of the shaft 13 relative to the sleeve. A suitable bearing, not shown, maintains the alinement at the lower end, within body member 1, to which sleeve 86 is fastened.

The diameter of worm wheel 85 is such that it does not touch either worm 66 or worm 81 when shift lever 9 engages stop 11 in neutral position as shown in Figures 3 and 4. The mechanism by which shifting lever 9 causes the gears to engage is shown in detail in Figures 4 and 5. The front plate 49 has a downward extension 87, and rear plate 65 has a corresponding extension 89. Bushings 90 and 91, respectively, extend toward each other from these extensions and carry protruding pins 92 and 94, respectively. These pins project into bushings 95 and 96, respectively, which are formed integral with a collar 97 fixed around sleeve 86, and constitute the supporting link between the base 1 and gear box 4. An arm 99, shaped to fit snugly against sleeve 86, is an integral part of the collar 97 and projects downwardly therefrom, terminating in a laterally extending stump 100 having an axial bore therein facing the front plate extension 87.

Shift lever 9 is supported by a shaft 101, journaled in a bushing 102 extending inwardly from front plate extension 87, on an axis parallel to but slightly out of line with the axis of the stump 100. The inner end of this shaft 101 terminates in an eccentric cam 104 arranged to fit into the bore of the stump 100.

Since the stump is held stationary with relation to the supporting sleeve 86 by collar 97, when control lever 9 is shifted by the operator to one side or the other of neutral position, the eccentric cam 104 will cause shaft 101 to swing through a short arc, thereby causing the whole gear box 4 to tilt about pins 92 and 94, in one direction or the other in accordance with the direction of shift of the control lever 9. This tilting of box 4 is sufficient, when the control lever has been moved as far as stop 10 or 12, to bring one or the other of worms 66 and 81 into engagement with worm wheel 85. By throwing the foot switch 6, power will be applied to the gear mechanism and the turntable will revolve at a speed depending upon which of the worms 66 or 81 has engaged the worm wheel 85.

It will be noted that the gear trains have been arranged so that the direction of rotation is the same for either speed, and the motor is driven in such direction that the table always turns to convey an uncleaned portion of a seam to the oxidizing torch 26 and then in succession, to the cleaning brush 34 and the welding rod 42. The speed of rotation used will of course depend on the amount of protective material and dirt to be removed, and the welding speed. All the factors involved can be easily controlled by a single operator. When proper adjustments have been made, it is only necessary for him to control the welding rod.

Drums which are heavily coated with protective paint or galvanizing will require slower speeds of rotation and in some cases a more powerful oxidizing flame. Care should be taken, however, that the cylindrical wall 110 of the drum is not burned deeply, as it might be so weakened that the drum would be unfit for service. Excess application of heat might also well serve to destroy any galvanizing or other interior protective coating which, of course, is not desirable. In general, a severe or prolonged heating is not required, as the steel brush 34 is very effective in cleaning the joint well down into the fold portion in which the outer surface of wall 110 lies next to the outer side of end wall 111. As a precaution against the effects of excess heat, it is within contemplation of the invention to at least partially fill the container with water or other heat absorbing medium, while the joint is being subjected to the various stages in the repair process.

The success of the invention is due in considerable part to the rapidity with which the welding follows the cleaning operation so that there is no time for the formation of oxide and the accumulation of dirt which would prevent making a firm bond. The proper result is seen in Figure 8, where a fillet 112 is formed by the union of metal from the rod with the metal of walls 110 and 111, the final seam being actually stronger than the original crimped seam, and incapable of leaking in the absence of actual failure of the metal.

In addition, the convenience of the device and the ease of operation make it profitable to repair metal drums. The expense of purchasing new drums is considerable, and where a satisfactory repair system is available, the savings may be quite appreciable.

What is claimed is:

1. An apparatus comprising a base having a sleeve extending upwardly therefrom; a bear box pivotally mounted on said sleeve; a shaft journalled in said sleeve and extending upwardly through said gear box; a drive connection on said shaft; a plurality of speed change systems having different speed characteristics, carried within said gear box and adapted to be tilted with said gear box to permit selective connection with the drive connection on said shaft, whereby to alter the rotational speed of said shaft while retaining said shaft in its original position; and means for tilting said gear box to effect such selective connection with said drive connection.

2. An apparatus comprising a base having a sleeve extending upwardly therefrom; a gear box pivotally mounted on said sleeve; a shaft journalled in said sleeve and extending upwardly through said gear box; a gear on said shaft; a plurality of gear trains of differing speed ratios carried within said gear box and adapted to be tilted with said gear box to permit selective connection with the gear on said shaft, whereby to alter the rotational speed of said shaft while retaining said shaft in its original position; and means for tilting said gear box to effect such selective connection with said gear.

MYRTLE CLARE MOORE,
*Administratrix of the Estate of Ben William Moore, Deceased.*